(12) United States Patent
Mowatt

(10) Patent No.: US 10,311,614 B2
(45) Date of Patent: Jun. 4, 2019

(54) CUSTOMIZED REALTY RENOVATION VISUALIZATION

(71) Applicant: Microsoft Technology Licensing, LLC, Redmond, WA (US)

(72) Inventor: David Mowatt, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/258,216

(22) Filed: Sep. 7, 2016

(65) Prior Publication Data

US 2018/0068474 A1 Mar. 8, 2018

(51) Int. Cl.
*G06T 11/60* (2006.01)
*G06F 3/0481* (2013.01)
*G06F 3/01* (2006.01)
*G06F 16/532* (2019.01)

(52) U.S. Cl.
CPC .............. *G06T 11/60* (2013.01); *G06F 3/012* (2013.01); *G06F 3/013* (2013.01); *G06F 3/04815* (2013.01); *G06F 16/532* (2019.01)

(58) Field of Classification Search
CPC .... G06T 11/60; G06T 19/006; G06Q 30/0643
See application file for complete search history.

(56) References Cited

U.S. PATENT DOCUMENTS

| | | | |
|---|---|---|---|
| 6,343,264 B1 * | 1/2002 | Fenton | G01J 3/526 345/426 |
| 7,006,977 B1 | 2/2006 | Attra et al. | |
| 7,277,572 B2 | 10/2007 | MacInnes et al. | |
| 7,834,883 B2 | 11/2010 | Adams | |
| 2002/0099617 A1 | 7/2002 | Fogelson | |
| 2003/0200131 A1* | 10/2003 | Gabbert | G06Q 30/02 705/7.32 |
| 2008/0103908 A1 | 5/2008 | Munk | |

(Continued)

OTHER PUBLICATIONS

"Lowe's Holoroom, Virtual Reality for Retail—VisualCommerce", Published on: Mar. 15, 2016 Available at: http://www.marxentlabs.com/ar-videos/lowes-holoroom-3d-augmented-reality-virtual-room-home-improvement/.

(Continued)

*Primary Examiner* — Jeffery A Brier
(74) *Attorney, Agent, or Firm* — Talem IP Law, LLP

(57) ABSTRACT

Applications and services providing customized realty renovation visualization are described. A realty renovation visualization service can, in response to receiving a request to customize a renovation visualization, query a data resource for a set of inspirational room images. The set of inspirational room images can be images of inspirational rooms with similar spatial characteristics as the room that is the subject of the customized renovation visualization. The request can include information about at least a room depicted in the renovation visualization and the data resource can be queried using parameters of a definite region of the room obtained from the information about at least the room. At least one customized room image can then be generated from the set of inspirational room images using one or more customizing criteria, and the at least one customized room image provided to the source of the request to include in the renovation visualization.

20 Claims, 10 Drawing Sheets

(56) References Cited

U.S. PATENT DOCUMENTS

| | | | |
|---|---|---|---|
| 2011/0119632 A1 | 5/2011 | Iyangar | |
| 2012/0259743 A1* | 10/2012 | Pate, Jr. | G06Q 30/00 |
| | | | 705/27.2 |
| 2013/0259308 A1* | 10/2013 | Klusza | G06K 9/00624 |
| | | | 382/103 |
| 2014/0075361 A1* | 3/2014 | Reynolds | G06F 3/0481 |
| | | | 715/771 |
| 2014/0095122 A1 | 4/2014 | Appleman et al. | |
| 2014/0132595 A1 | 5/2014 | Boulanger et al. | |
| 2014/0304661 A1* | 10/2014 | Topakas | G06F 3/04815 |
| | | | 715/848 |
| 2015/0243100 A1* | 8/2015 | Abovitz | G06K 9/00671 |
| | | | 345/633 |

OTHER PUBLICATIONS

"Augmented Reality Market Network for Home Design and Improvement", Retrieved on: May 16, 2016 Available at: http://www.elementalsweb.com/home_augmented_reality_designer/.

Rodway, Jason, "6 Interior Design Apps Offer Help With a Swipe", Published on: Mar. 14, 2012 Available at: http://www.apartmenttherapy.com/6-home-design-apps-weekly-smartphone-app-roundup-167368.

\* cited by examiner

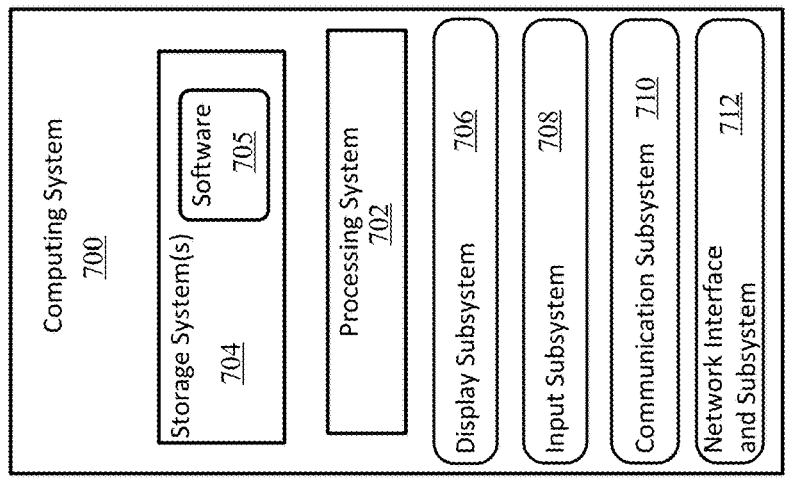
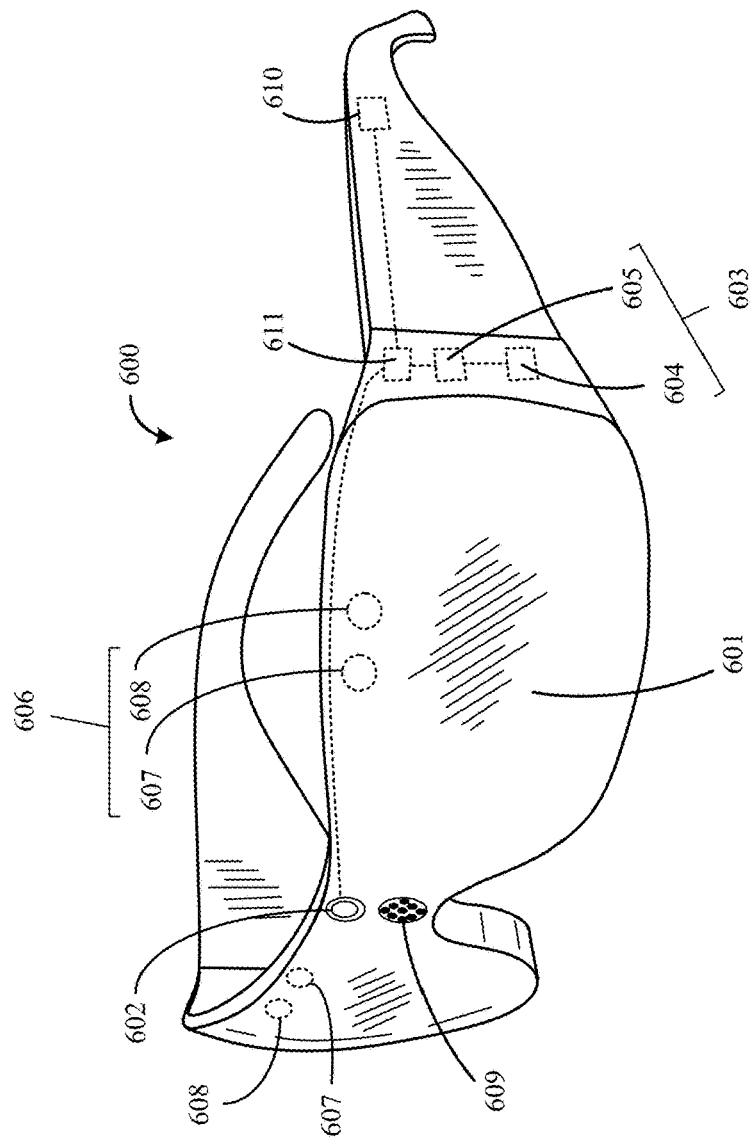
FIG. 7
FIG. 6

CUSTOMIZED REALTY RENOVATION VISUALIZATION

BACKGROUND

A home may be purchased in many different ways, such as through a real estate agent, from a bank, through an auction, or from the homeowner themselves. Potential buyers use different resources to view such a home before making a purchase. These resources include searching real estate websites for images of the home, viewing the home in person, and utilizing websites and online communities about architecture, interior design, decorating and home improvement, such as HOUZZ, a registered trademark of Houzz, Inc., to try to visualize how the home could be transformed.

However, in current real estate markets, house hunting can be challenging and time consuming for the potential buyer. A significant amount of the homes on the market today come from people who have lived in their homes for a long period of time without making any updates. Today's real estate agents hope that home owners update and stage their homes, but that is not always the case, leading to many people not buying a suitable house because they do not like how it looks or they cannot see how it might be renovated.

BRIEF SUMMARY

Applications and services providing customized realty renovation visualization are described.

A realty renovation visualization service can, in response to receiving a request to customize a renovation visualization, query a data resource for a set of inspirational room images. The request can include information about at least a room depicted in the renovation visualization and the data resource can be queried using parameters of a definite region of the room obtained from the information about at least the room. At least one customized room image can be generated from the set of inspirational room images using one or more customizing criteria, and the at least one customized room image provided to the source of the request to include in the renovation visualization.

The set of inspirational room images can be images of inspirational rooms with similar spatial characteristics as the room that is the subject of the customized renovation visualization. The customizing criteria used to generate the at least one customized room image can include, but is not limited to, style preference of a user or a group of users (all users or a subset of users). The customized room images can be specific inspirational room images from the set of inspirational room images or a specific inspirational room image from the set of inspirational room images overlayed on an image of the room.

The information about the room that is provided with the request can be as simple as a room identifier (that the service can use to retrieve parameters from a structured data source storing information on known rooms for the visualization) to as substantial as floor plans, photographs, and/or text input.

A mobile application or web application can be provided for facilitating custom renovation visualizations. The mobile application or web application communicates with the visualization service to request customized renovation visualizations. The mobile application or web application, running on a user's computing device can include features such as image capture and display. A graphical user interface can be provided through which user preferences and selections can be made and outcomes of the customized renovation visualizations can be displayed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 6 illustrates an example head-mounted display-based holographic enabled device that may be used in certain implementations described herein.

FIG. 7 illustrates an example computing system of a holographic enabled device.

DETAILED DESCRIPTION

Applications and services providing customized realty renovation visualization are described. "Realty", also referred to as "real estate", is defined as real, fixed property. The described applications and services enable users to visualize possible renovations to a property without requiring extensive design or model creation. Photographs and other images of existing renovations, such as available through HOUZZ or accessible from an image search using, for example, BING or GOOGLE, can be leveraged to provide customized realty renovation visualizations. Designers and builders can directly contribute images to the applications and services as well. These photographs and other images can be considered "inspirational room images". The visualization service can dynamically suggest images of physical spaces based on similarity of door/window position, room dimensions, popularity, geo-location, and even available budget. The images can be customized, or personalized, for a user based on a user's preferences.

A realty renovation visualization service can, in response to receiving a request to customize a renovation visualization, query a data resource for a set of inspirational room images. The request can include information about at least a room depicted in the renovation visualization and the data resource can be queried using parameters of a definite region of the room obtained from the information about at least the room. At least one customized room image can then be generated from the set of inspirational room images using one or more customizing criteria, and the at least one customized room image provided to the source of the request to include in the renovation visualization.

The set of inspirational room images can be images of inspirational rooms with similar spatial characteristics as the room that is the subject of the customized renovation visualization. The customizing criteria used to generate the at least one customized room image can include, but is not limited to, style preference of a user or a group of users (all users or a subset of users). The customized room images can be specific inspirational room images from the set of inspirational room images or a specific inspirational room image from the set of inspirational room images overlayed on an image of the room.

The information about the room that is provided with the request can be as simple as a room identifier (that the service can use to retrieve parameters from a structured data source storing information on known rooms for the visualization) to as substantial as floor plans, photographs, and/or text input.

Figure 1A:
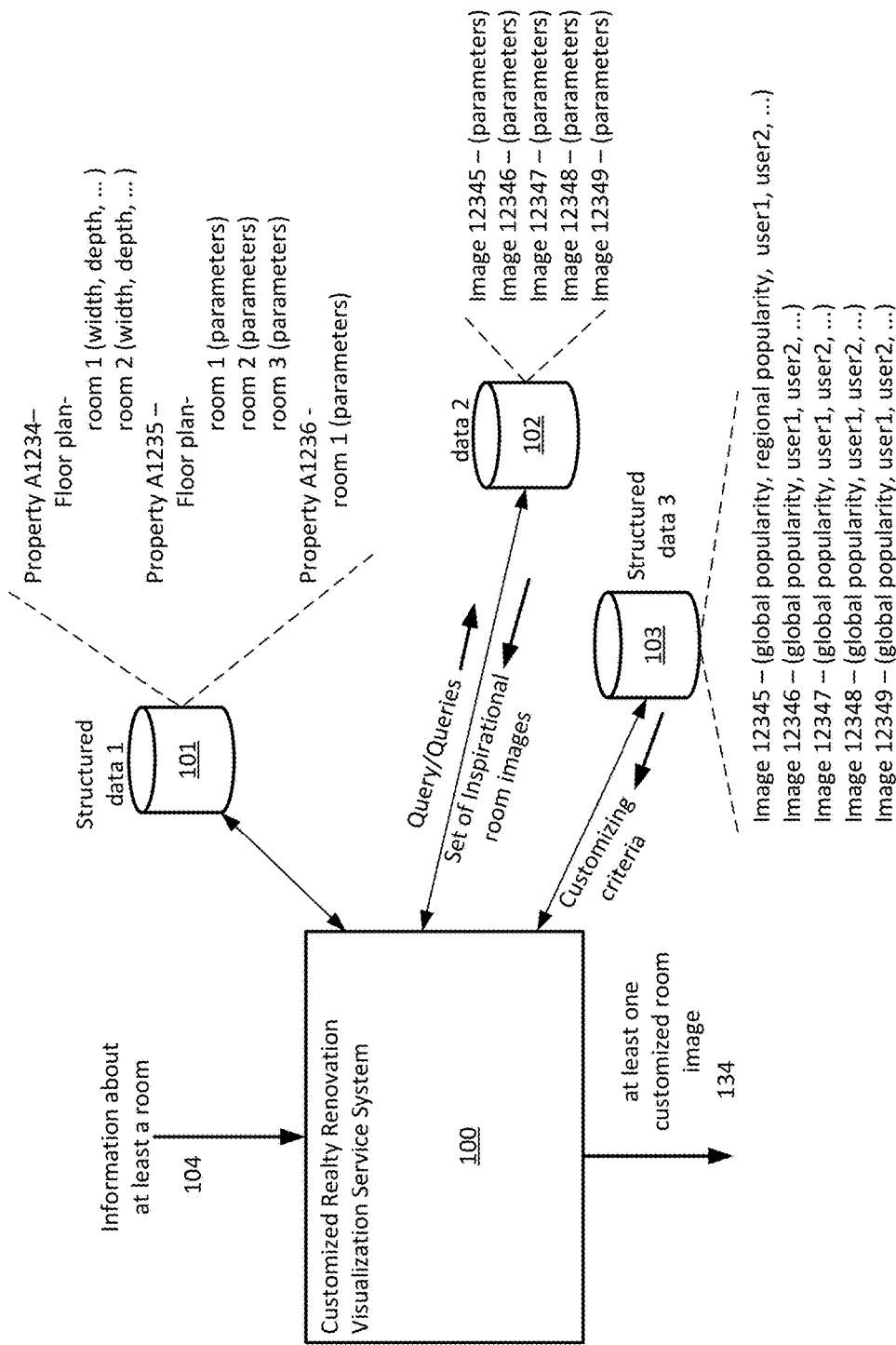
FIG. 1A illustrates a customized reality renovation visualization service.
Figure 1B:
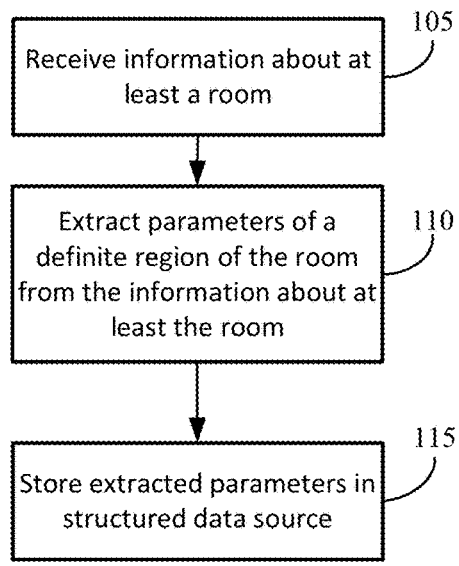
FIGS. 1B and 1C illustrate example processes for providing customized realty renovation visualization.
Figure 1C:
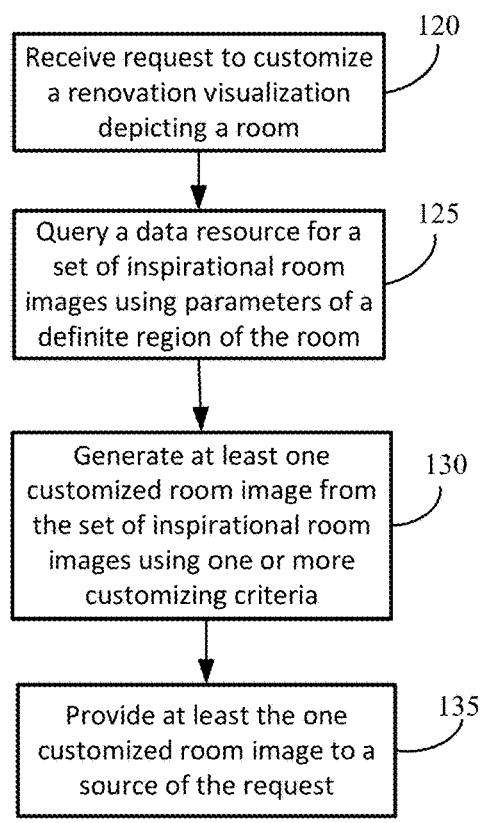

FIG. 1A illustrates a customized reality renovation visualization service; and FIGS. 1B and 1C illustrate example processes for providing customized realty renovation visualization.

Figure 8:
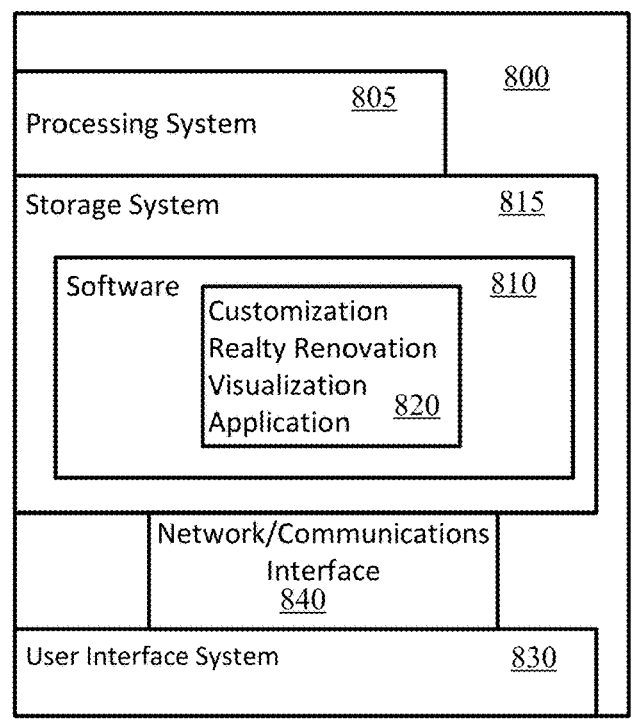
FIG. 8 illustrates components of a computing device that may be used in certain implementations described herein.
Figure 9:
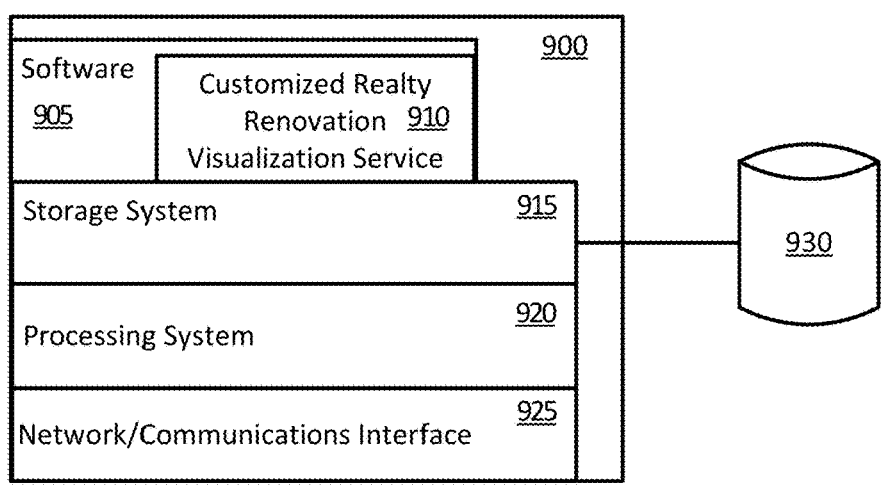
FIG. 9 illustrates components of a computing system that may be used to implement certain methods and services described herein

Referring to FIG. 1A, a visualization service performing processes such as illustrated in FIGS. 1B and 1C can be implemented by a system 100, which can be embodied as described with respect to computing system 900 as shown in FIG. 9 and even, in whole or in part, by computing systems 700 or 800 as described with respect to FIGS. 7 and 8. System 100 includes or communicates with one or more resources storing a first structured data set 101, a second data set 102 (which may include structured, semi-structured, or unstructured data), and a third structured data set 103. The first structured data set 101 may contain the set of available properties for purchase, including dimensions and photos of those properties' existing rooms; the second data set 102 may contain inspirational photos of rooms, including information on those rooms' dimensions, style, and other properties; and the third structured data set 103 may contain information about the popularity and relatedness of inspirational images. It should be understood that these data sets may be stored on a same or different resource and even stored as part of a same data structure. Communication to and from system 100 may be carried out, in some cases, via application programming interfaces (APIs).

An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture.

Referring to both FIG. 1A and FIG. 1B, a visualization service, such as implemented by system 100, can receive information 104 about at least a room (105). The service uses the received information 104 to obtain parameters of a definite region of a room so that when a request for custom visualization is received (which may be during same session as when the information was received or during a separate session that may even be requested by a different client or user), the parameters can be used to identify a set of inspirational room images. For example, a user may be looking at a particular existing room of a house they are interested in purchasing and request a custom visualization.

The information 104 received by the visualization service—and stored and utilized—can include, but is not limited to, one or more of an image, sensor data, a floor plan, and user input data. The information may be for a home that the user is interested in updating, renovating, or redecorating. In some cases, the information may include information that refers to an entire house, such as a floor plan. In other cases, the information may include information for one room within a house, such as an image of a kitchen. The information may be related to commercial or residential properties. Of course, the visualization service is applicable to other fixed spaces, including offices and gardens.

The information may be received through a variety of channels and in a number of ways. For example, a user (such as, but not limited to, an employee of a realty agency or a person wanting to perform the renovation) may upload an image of a room and/or floor plans through a submission portal or other interface to the visualization service. In some cases, the submission portal or other interface is accessible through an Internet browser executing on a user device. As another example, a user may search a real estate website or application for current house listings and select an image of room, the selection then being communicated by the real estate website or real estate application to the visualization service. As another example, a user may fill in room parameters on a form available from an application or a website (which may be a visualization application or include a visualization feature). As yet another example, the visualization service may receive sensor data of a physical space from at least one sensor of a holographic-enabled device or even a stand-alone camera with Internet connectivity. Examples of sensor data include, but are not limited to data from an optical or image sensor, data from a position sensor, data from an orientation sensor, and data from a pressure sensor.

As can be seen from the provided examples, there may be three scenarios in which the information 104 is received by the visualization service. In one scenario, the information 104 is being sent for later use in a renovation visualization. This first scenario may arise, for example, for a real estate web site that is including a renovation visualization feature for visitors to the site. Another example where this scenario may arise is for a case that a user takes photographs of a room or rooms of a property and the user's smart camera or mobile device communicates the images to the visualization service for later use by the user when the user accesses a renovation visualization application or website having the functionality with a separate client and/or device. In these examples, when a user is on a website with a renovation visualization feature or using a renovation visualization application (or other application with renovation visualization feature), that user can select one of the rooms already provided to the visualization service.

In the second and third scenario, the information 104 is provided at the time of the renovation visualization. That is, at the time of a request to customize a renovation visualization. In the second scenario, the information 104 may be the same information as provided and described with respect to the first scenario; however, for the third scenario, the information 104 may alternatively be a room identifier or information sufficient for the service to obtain previously provided (and stored) information. The second scenario may arise, for example, in cases where a user wants to provide their own image or information to be depicted in the renovation visualization and the service does not already have the information. The third scenario may arise, for example, in cases, where the visualization already has information stored about the room.

In the first and second scenarios described above, as illustrated in FIG. 1B, the information 104 received by the service is processed to extract (110) certain parameters and these parameters are stored (115) in a structured data source as part of the first structured data set 101. The certain parameters extracted by the service may be of definite regions of the room, the definite regions being those regions that would be viewable in an image or viewing window of the room. "Viewing window" refers to the portion of the room that can be seen at a given time within the constraints of a display or what a person can physically see in their field of view. A room/definite region identifier may be generated by the service for ease of access to the data when a request to customize a renovation visualization is later received.

According to certain embodiments, the definite region of a room may refer to at least a portion of a room of the received information. For example, if the information was a floor plan, then the definite region of a room may refer to at least a portion of a room from the floor plan, such as the living room or a fireplace wall of the living room. In another example, if the information was an image of a kitchen, then the definite region of the room refers to the part of the kitchen shown in the image of the kitchen, which can have one or more walls and/or corners in view.

The parameters of a definite region of a room extracted from the information 104 (and possibly stored as part of the first data set 101) can include, but are not limited to, one or more of a spatial dimension of the room, a position of at least one door in the room, a position of at least one window in the room, a viewing angle (e.g., camera angle, directional orientation), a position of at least one fixed object in the room, a purpose of the room, an indication of whether a given quadrant of the room is carved out (e.g., creating an "L" shaped room), a name of an entity of the room (e.g., "dining room", "kitchen", "entry", "fireplace wall", etc.), a street address of a property where the room is located, a town where the room is located, a geographical reference point of the room, a style of the room, and an indication whether the room is split at a given position (e.g., the room covers a living and dining space or has a separating mechanism such as a sliding door).

In a case where a form is used, the parameters may be extracted in operation 110 directly from the input fields. For operation 110, in a case where sensor data is provided as part of the information, the sensor data may be converted or transformed in a manner to associate the data with certain parameters (e.g., GPS data may be used to identify location with various granularity, distance information from an IR sensor may be used to determine room size, etc.).

In a case where images or a combination of images and other content is provided as the information about the room, the parameters may be extracted, in operation 110, from metadata provided as part of the information and/or identified from image recognition techniques. Optical character recognition may be performed on floor plans to extract room information. For the metadata or other text-based information, slot filling techniques may be used to extract (and classify) appropriate information for certain parameters from the received information. For image recognition/image analysis, some aspects may be performed by the visualization service and/or via an application programming interface (API) to an image analysis services, such as available through search engines like Microsoft® Bing or Google®.

In some implementations, once the parameters are extracted (and/or otherwise identified), the parameters may be presented to the user providing the original information 104 to allow for modification. For example, a potential buyer may be at an open house for a current real estate listing and captured an image of a room on their mobile device. The potential buyer may not have access to all the information about the room, but would still like to use the visualization application. The potential buyer can send the image as the information 104. The visualization service extracts the parameters of the room from the image using, for example, image analysis, and the extracted parameters can then be presented to the user to allow the user to input any additional information they may be aware of to facilitate better matches to inspirational room images.

As mentioned above, in the case of the first and second scenarios, once the parameters are extracted (110), the extracted parameters can be stored (115) as part of the first structured data set 101.

During run-time, as illustrated with reference to FIG. 1A and FIG. 1C, the service can receive a request to customize a renovation visualization depicting a room (120). The information 104 can be provided with the request. The parameters of a definite region of the room can be obtained—either by the extraction processes described above with respect to operation 110 or by retrieving parameters previously stored during operation 115, depending on what type of information about the room is provided. In response to the request to customize the renovation visualization depicting a room, the service uses the parameters to query (125) a data resource storing the second data set 102 for a set of inspirational room images. Inspirational room images may be, but are not limited to, images of rooms that have been recently renovated or redecorated or images of rooms in homes that have been recently built.

Sources of the inspirational room images can include photographs and other images of existing renovations, such as available through HOUZZ or accessible from an image search using, for example, BING or GOOGLE. Designers and builders can directly contribute images to be stored as part of the second data set 102.

The second data set 102 may include a collection of inspirational room images and metadata associated with the collection of inspirational room images. The metadata associated with the collection of inspirational room images may include, but is not limited to, any or all of the same parameters that may be stored as part of the first structured data set 101.

For example, the metadata can include, but is not limited to, one or more of a spatial dimension of the room, a position of at least one door in the room, a position of at least one window in the room, a viewing angle (e.g., camera angle, directional orientation), a position of at least one fixed object in the room, a purpose of the room, an indication of whether a given quadrant of the room is carved out (e.g., creating an "L" shaped room), a name of an entity of the room (e.g., "dining room", "kitchen", "entry", "fireplace wall", etc.), a street address of a property where the room is located, a town where the room is located, a geographical reference point of the room, a style of the room, and an indication whether the room is split at a given position (e.g., the room covers a living and dining space or has a separating mechanism such as a sliding door). In addition, the metadata stored as part of the second data set 102 can include a price/cost for features and/or objects in the inspirational room and information concerning sources for the features and/or objects in the inspirational room (e.g., vendor or builder information).

According to certain embodiments, the visualization service may search and/or traverse a data resource storing the second data set 102 and compare the parameters from the definite region of the room (obtained from the information 104 and which may be stored as part of the first structured data set 101) against the metadata (stored as part of the second data set 102) associated with inspirational room images of the collection of inspirational room images to identify the set of inspirational room images satisfying certain criteria. The certain criteria generally entail a resulting match (which can be a fuzzy match) with at least a spatial parameter of the definite region of the room.

That is, the set of inspirational room images identified from the data resource may, at a minimum, have spatial characteristics with a fuzzy match to the definite region of the room. A fuzzy matching technique enables both exact matches and those that have less than a 100% of a match. With respect to spatial characteristics, a fuzzy match may, in some implementations, occur even where no single dimension has an exact match.

For example, if metadata (structured or unstructured) that is associated with an inspirational room image has a fuzzy match with at least one of the parameters from the definite region of the room, that inspirational room image is included in the set of inspirational room image. As another example, the query that uses one or more parameters of the definite region of the room is executed against the second data set 102 for each record of the second data set 102, and a ranking performed based on the fuzzy matching of the parameters of the definite region of the room to that of each inspirational room image. Inspirational room images having a score above a certain threshold value may be considered part of the set of inspirational room images. That is, the visualization service can execute a query against the second data set 102 and assign a similarity (or relevancy) score to each inspirational room image based on a fuzzy matching algorithm. Inspirational room images having a similarity (or relevancy) score above a certain threshold value may be considered part of the set of inspirational room images.

As an illustration of a fuzzy match, in the inspirational room image, a door may be five inches to the left when compared to a door in the definite region of the room. While it may not be an exact match to a door location parameter, the inspirational room image can be included in the set of inspirational room images. The deviation of the position of the doors may be taken into account in determining relevancy, for example, by reducing an assigned relevancy score (that can be used to sort and/or rank images).

A variety of optimizations may be carried out. For example, a finite range of pre-defined room 'shapes' (e.g., a room which is 8 feet wide and 12 feet deep, with one window at the back center and one door on the front left) may be computed. Then, each room (e.g., the room or the inspirational room) may be tagged as belonging to one or more of these shapes. Thus, rather than searching all entries of the second structured data set 102, only rooms having a particular tag may be compared. In certain implementations, poorly performing matches may be discarded as the query is executed.

Once the set of inspirational room images is identified (125), at least one customized room image is generated from the set of inspirational room images using one or more customizing criteria (130). The set of inspirational room images is customized to a user by identifying from the set of inspirational room images at least one inspirational room image that satisfies one or more customizing criteria. The customization can include ranking and sorting processes based on relevancy to one or more customizing criteria. The one or more customizing criteria can involve style preferences, popularity, region, and others. The at least one inspirational room image 134 that satisfies the customizing criteria can be provided for display to a user as part of the customized realty renovation visualization.

The customizing criteria may include, but are not limited to, one or more of a price, popularity, a time, a location, a style, or a color. In one embodiment, the customizing criteria to which results are customized may be a default setting, such as most popular. In another embodiment, the customizing criteria may be user-defined. The third structured data set 103 can record popularity of renovation images across multiple dimensions, for example, global popularity, popularity for a community of users, popularity for a given room in a given house, and popularity for a given user. It should be understood that any data stored regarding specific users would be done in a manner following established norms and rules for privacy (and involve user approval). Voting and supplementary tagging can inform the popularity data stored as part of the third structured data set 103. Frequency tables and other data evaluation techniques may be provided and stored as part of the third structure data set 103.

In some implementations, the operation of generating at least one customized room image from the set of inspirational room images (130) can be performed during the identifying the set of inspirational images. That is, in addition to querying the data resource for inspirational images have at least spatial characteristics in common with the definite region of the room, other criteria related to customizing criteria can be included in the search. This other criteria related to customizing criteria can be related to style, geographical location of the property, geographic location of the architect, designer, or person who submitted the image (if not the architect or designer), and cost.

For each fuzzy match found during the query/queries a set of scores can be produced by comparing the definite region of the room (and its parameters) to a given inspirational room image (and its parameters). In one implementation, for each inspirational room image, a score from 0-1 may be assigned for each of the different criteria. As an illustrative example, scores may be assigned based on a similarity in a depth, a similarity in a width, a similarity in window one position vs. window two position, a similarity in a door position, a similarity in a quality in view from window one vs. window two, a similarity in a purpose (e.g., bedroom may have a 1.0 match for bedroom and a 0.8 match for study), a similarity in a style (e.g., whether they both contain the tag 'country style'), and a similarity in a viewing angle (e.g., photographer's position).

Other criteria can be used to produce a score. The other criteria can be based on user preferences and popularity. As an illustrative example of such customizing criteria, the criteria can include a popularity of the inspirational room, a popularity of the inspirational room when shown for the room, and a similarity between a budget range of the room and a preferred budget specified by a user in the customizing criteria. For example, there may be a general boost in the score for an inspirational room image based on how popular it is. The popularity may be a general popularity, such as the popularity of a specific inspirational room image of a particular inspirational room or a particular style across the entire website. Furthermore, the popularity may be on an image by image basis, such as, how popular a particular inspirational room image may be for a specific room. In another example, the inspirational room image may get a score demotion based on the degree to which the inspirational room image shown is of a style that the user does not prefer. However, if it is of a style that the user likes, the inspirational room image may get a boost in the score. Assigning a score based on any of the popularity criteria may involve reading a score stored as part of the third data set 103 and assigning that score to the inspirational room image.

According to certain embodiments, user preferences (and customizing criteria), such as price, time, location, and style, may be derived from the user's implicit behaviors. For example, the user's style preference may be derived from how many images the user clicked on of a particular image or how many styles the user has filtered to suggest the style of modern or the style of country. Further, as described above, the user may explicitly provide their preferences, such as in their particular customizing criteria.

In yet another embodiment, voting by users and supplementary tagging may improve the ranking still further.

The scores produced by identifying from the set of inspirational room images at least one inspirational room image that satisfies a customizing criteria may then be summed or otherwise combined to produce a single numeric score. In an example implementation, the single numeric score may represent the quality of match between the room and inspirational room and may be referred to as a room comparison score. According to various embodiments, the full list of scores may then be sorted. The sorting may be from high to low, so as to produce a sorted list.

Advantageously, the visualization service may then provide the at least one customized room image 134 to a source of the request for customized realty renovation visualization (135). The customized room images can be specific inspirational room images from the set of inspirational room images or a specific inspirational room image from the set of inspirational room images overlayed on an image of the room.

Once received by a user's computing device, the customized room image(s) may then be displayed to the user in a variety of ways and include various information, such as, but not limited to, a price range for the cost to build or renovate that particular room and the name and contact information for the architect or interior designer that performed the build or renovations.

In some cases, the customized room image(s) may be displayed as an overlaid image on the website in which the information about the room was received. In some cases, the inspirational room image(s) may be displayed as a separate image from the information about the room which was received. In some cases, the inspirational room image(s) may be displayed through a holographic enabled device implemented as a head mounted device (HMD). Through the use of a holographic-enabled device, the user can display the inspirational room image(s) received from the visualization service and transformed into holographic representations, which may be overlaid in appearance onto the surfaces of the room.

Accordingly, the customized room image(s) can be a way for the user to see not only the original room, but a set of inspirational rooms with architect/interior designer and price tag. For example, users view a house and see a room that they believe is not appealing because it was built in the 1970's. Using a home design application or an image search, the user may find an image of an inspirational room that they like, but the image may bear no resemblance the room they are currently in. Therefore, they may not have confidence that the renovations would actually work in that space. However, when the user uploads an image (or other information) to an application employing the visualization service (or selects an image already uploaded), the software may make the leap for them. The inspirational room image(s) may be displayed to the user in a manner that allows them to can see what the room could look like. The users can see that the room sizes are similar, and, in some cases, may even be given a price tag (or price range) as well as someone who offers the professional services associated with the inspirational room image(s).

As a use case example, a real estate agent may have taken measurements of a property, as well as pictures of each of the rooms in the property. The real estate agent may then upload the images to a website running the software containing the visualization service. The real estate agent may also, for each room, input the room parameters into a form, such as spatial dimensions and viewing angle. In this case, since the information received by the visualization service is both an image and metadata, then the parameters can be extracted using the associated metadata the real estate agent input.

As a further use case, real estate agents may be able to use the user's preferred inspirational room image to proactively contact the architect or interior designer and ask them to prepare a brochure of possible renovations for upcoming house viewings. This insight may not be possible otherwise due to the scale of permutations involved.

A mobile application or web application can be provided for facilitating custom renovation visualizations. The mobile application or web application communicates with the visualization service to perform customized renovation visualizations. The mobile application or web application, running on a user's computing device can include features such as image capture and display. A graphical user interface can be provided through which user preferences and selections can be made and outcomes of the customized renovation visualizations can be displayed.

Figure 2A:
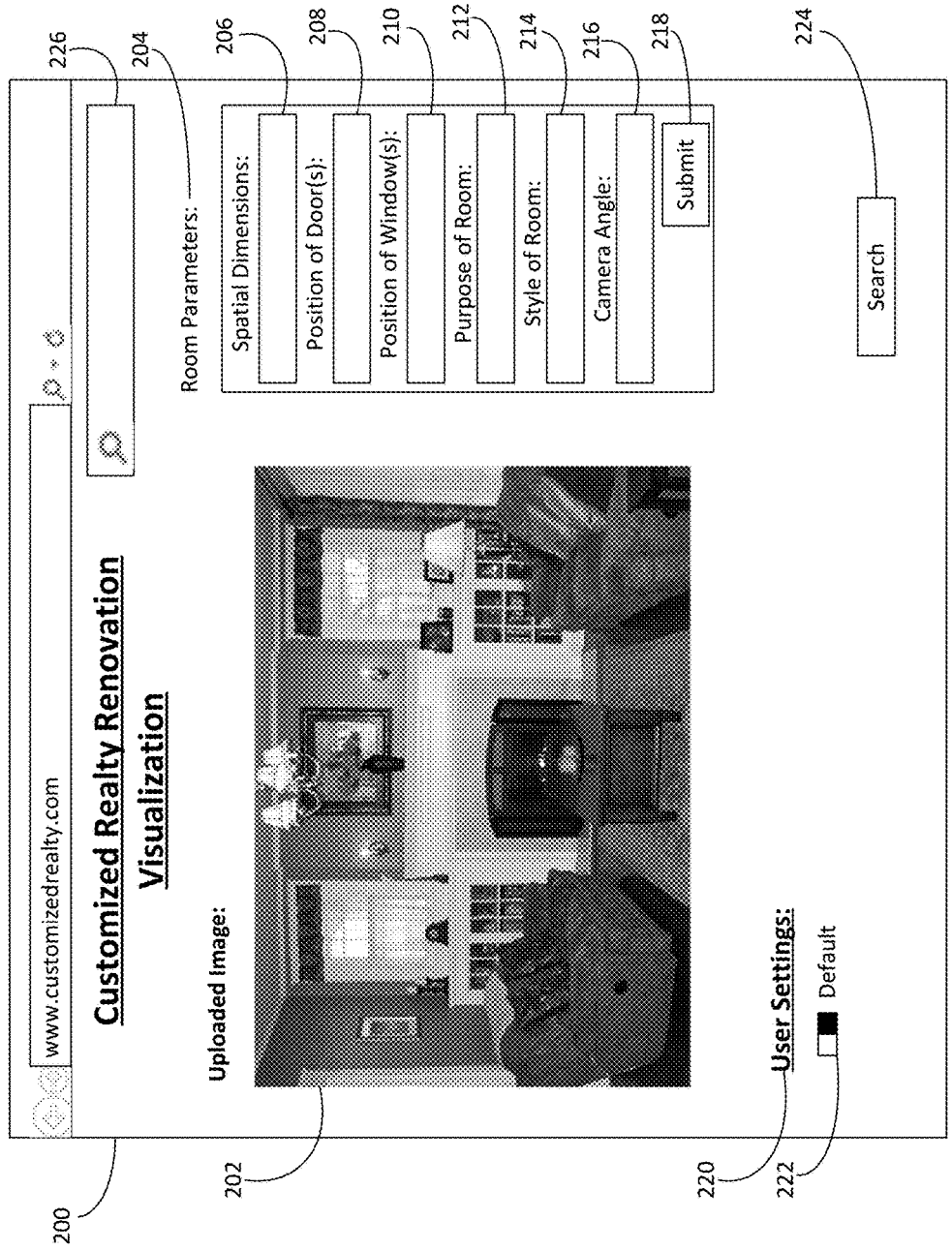
FIGS. 2A-2C illustrate example scenarios of a renovation visualization carried out at a mobile application or web application.
Figure 2B:
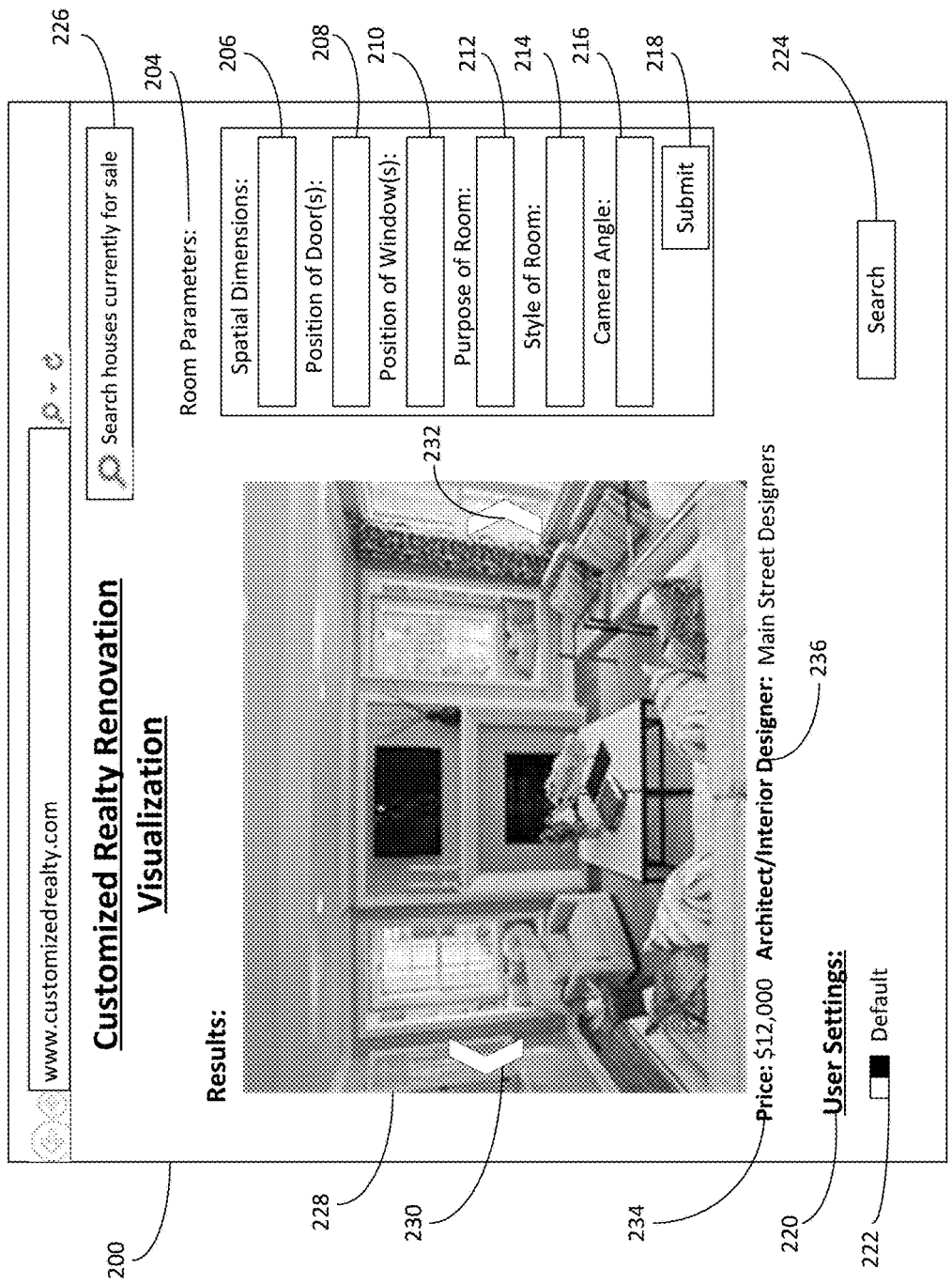
Figure 2C:
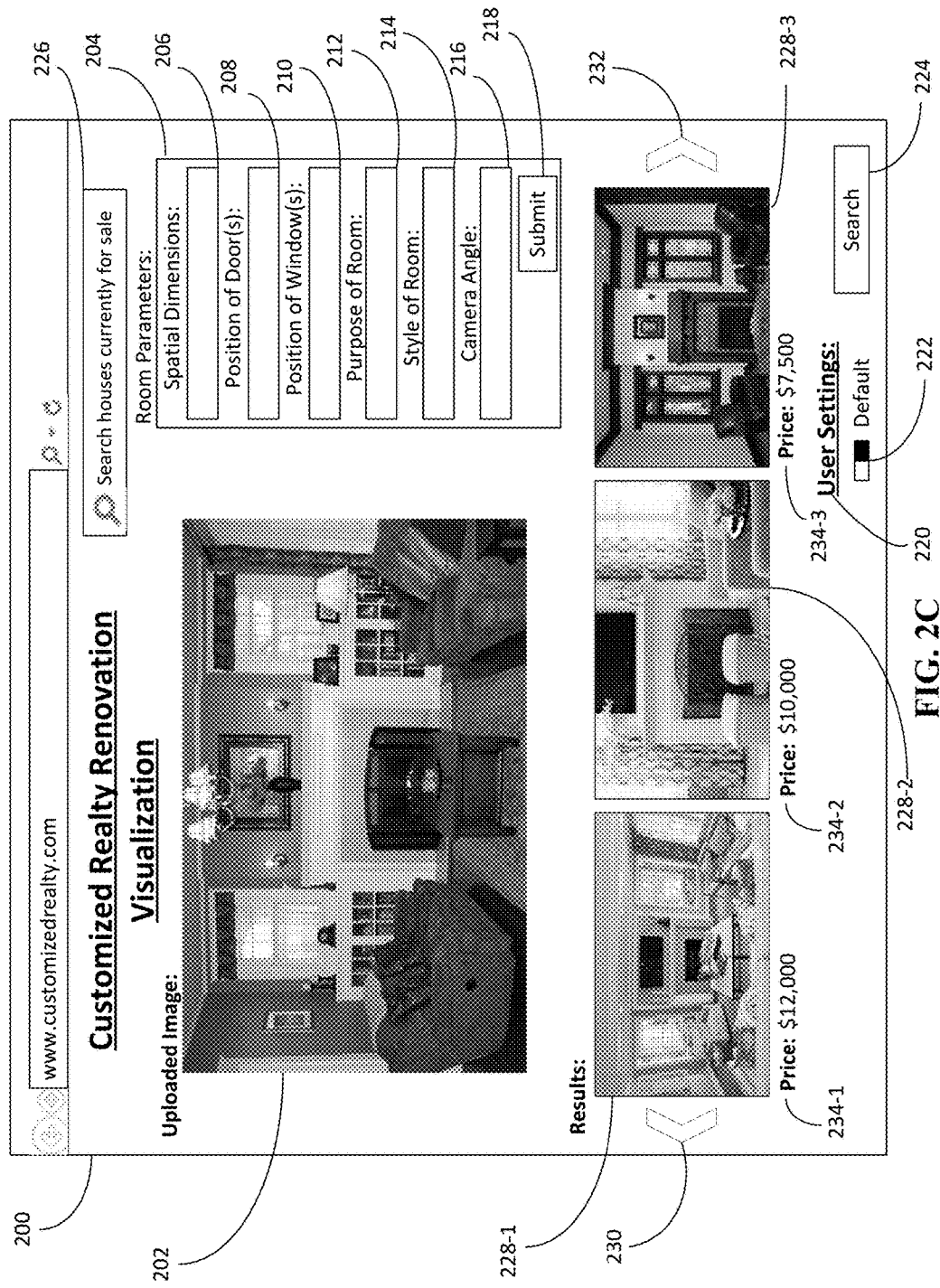

FIGS. 2A-2C illustrate example scenarios of a renovation visualization carried out at a mobile application or web application. Referring to FIG. 2A, a user may open a visualization website 200 on their computing device. The computing device can be any computing device such as, but not limited to, a laptop computer, a desktop computer, a tablet, a personal digital assistant, a smart phone, a smart television, a gaming console, wearable device, and the like.

On the site 200, the user may be able to browse existing photographs of rooms of homes or be able to upload their own images. According to various embodiments, the user may also be presented with a search input window in the UI of the visualization website 200 for providing a search input to be used when searching houses currently for sale. For example, if a user would like to utilize the visualization website 200 while searching for possible homes to purchase in the Seattle, Wash. area, they can enter input such as '4 bedrooms 3 baths Seattle Wash.'.

In some cases, a user may also be able to manually input room parameters into a room parameters fillable form 204 on the user interface (UI). The room parameters may include spatial dimensions 206, positions of door(s) 208, position of window(s) 210, purpose of the room 212, style of the room 214, and viewing angle 216 as some examples. Once the user has manually input all of the room parameters 204, the user may select submit 218, within the fillable form 204.

For a particular image, such as image 202, a renovation visualization can be customized, for example, in response to a search request submitted by selection of a search command 224. In some cases, selection of the submit command 218 may initiate the customized renovation visualization.

In some cases, the website 200 can include a feature for a user to select customizing criteria 220 before beginning the search process or later to additionally refine the results. In one embodiment, the customizing criteria 220 may be set to default 222. The default setting may be a style, such as modern, or include multiple preferences such as style, price, and location (e.g., regional preferences or properties). In some cases, the default setting may involve a 'most popular' type of setting.

In some cases, an input field 226 for a natural language input can be provided through which information about a room can be input.

In certain embodiments, any parameters extracted from information received about a room can be presented to the user in the UI to facilitate any corrections or modifications.

Referring to FIG. 2B, after the user requests to customize a renovation visualization, for example by selecting the search command 224, one or more customized room image may be received from the visualization service and displayed to the user. In the illustrative example, an inspirational room image 228 is shown for the renovation visualization. The image 228 may be the image itself (from another home) or a combination image with the inspirational room overlaid on the original image 202 on the visualization website 200.

The inspirational room image 228 may include a price 234 for the cost to build or renovate that particular inspirational room and the name 236 of the architect or interior designer that performed the build or renovations. For example, for renovations to inspirational room image 228, the price 234 may be '$12,000' and the name 236 may be 'Main Street Designers'.

According to certain embodiments, the user may select the name 236 of the architect/interior designer in order to obtain contact information. The contact information may include a business address and a business telephone number.

The UI of the visualization website 200 may include arrows, such as left scroll arrow 230 and right scroll arrow 232 to move between the results. Further, the room parameter fillable form 204 may allow for the modification of the room parameters, such as parameters 206, 208, 210, 212, 214, and 216, once the inspirational room image(s) are presented to the user. Additionally, the customizing criteria 220 may also be modified after the user receives the inspirational room image(s) in order to further customize the results.

The user may, at any time, modify the room parameter fillable form 204, the customizing criteria 220, or other information (e.g., data input into the search input window 226) in order to perform a new search.

FIG. 2C shows another configuration for displaying the results. Referring to FIG. 2C, the uploaded image 202 may still be displayed to the user along with the results. The one or more customized room images may be displayed as separate images, such as inspirational room image 228-1, inspirational room image 228-2, and inspirational room image 228-3. The inspirational room images 228-1, 228-2, 228-3 may include a price 234-1, 234-2, 234-3 for the cost to build or renovate that particular inspirational room.

According to certain embodiments, the user may select the inspirational room image 228-1, 228-2, 228-3 or the price 234-1, 234-2, 234-3 of the renovations or modifications in order to obtain contact information. The contact information may include a name of an architect/interior designer, a business address and a business telephone number. The UI of the visualization website 200 may include arrows, such as left scroll arrow 230 and right scroll arrow 232 to move between the results. Further, the room parameter fillable form 204 may allow for the modification of the room parameters, such as parameters 206, 208, 210, 212, 214, and 216, once the inspirational room image(s) are presented to the user. Additionally, the customizing criteria 220 may also be modified after the user receives the inspirational room image(s) in order to further customize the results.

The user may, at any time, modify the room parameter fillable form 204, the customizing criteria 220, or other information (e.g., data input into the search input window 226) in order perform a new search.

Figure 3:
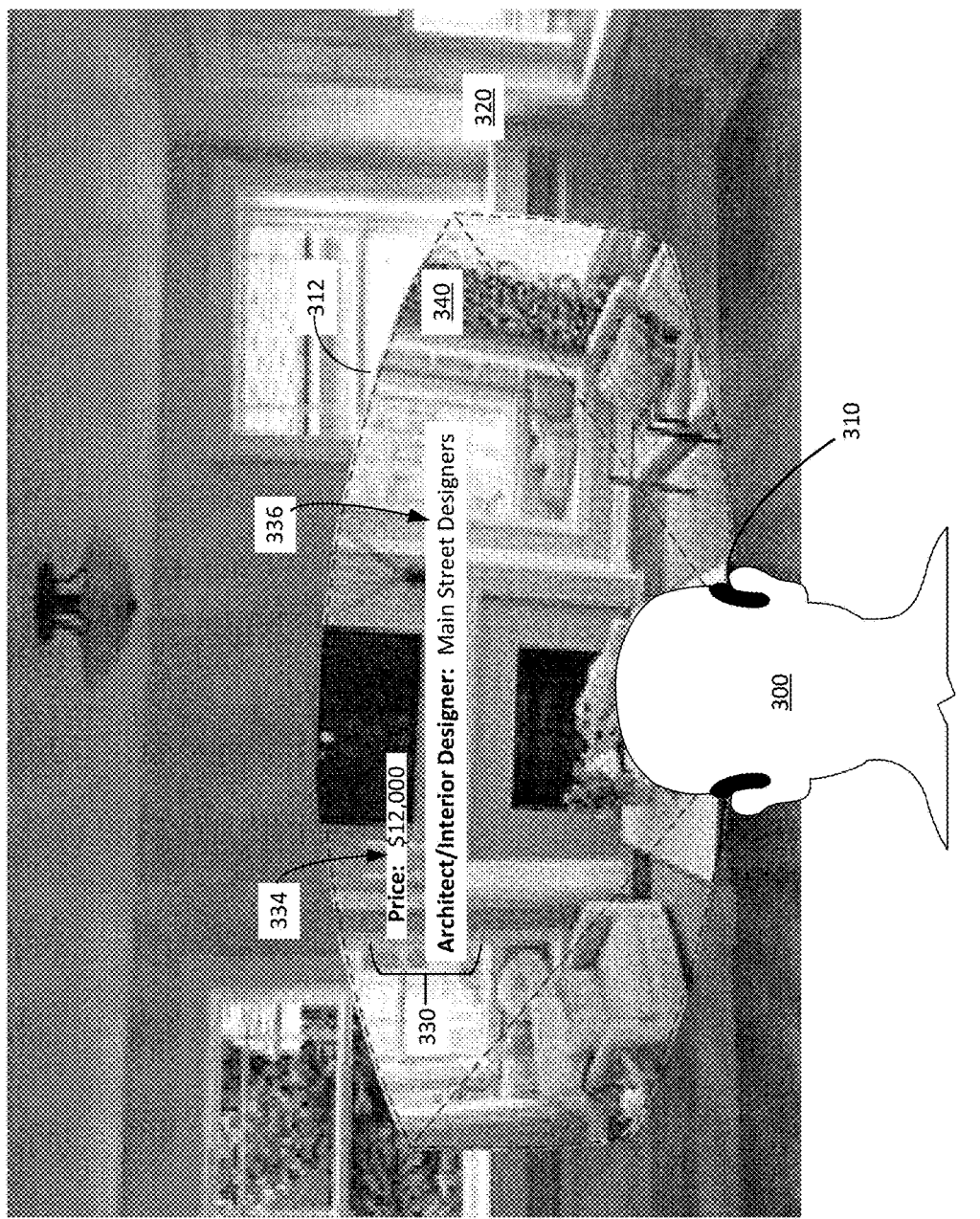
FIG. 3 illustrates an example scenario of a renovation visualization carried out at a holographic-enabled device.

FIG. 3 illustrates an example scenario of a renovation visualization carried out at a holographic-enabled device. A visualization application can run on a holographic-enabled device in a similar manner to any other computing device; however, on the holographic-enabled device, the graphical user interface for the visualization application can be anchored to an object in the room or be made to follow the user of the holographic-enabled device. When implementing the holographic-enabled device as a head-mounted display system, gaze, gesture, and/or voice can be used instead of a mouse, keyboard or touch.

Referring to FIG. 3, a user 300, while viewing a room 320 in a house for sale, can holographically augment their house hunting experience by using a HMD device 310 implementing a holographic enabled device. In their field of view 312, the user 300 can view the inspirational room image(s) 340 received from the visualization service and transformed into holographic representations by the HMD device 310. The holographic representations can be anchored to the objects in the physical room. Additional information 330 such as price of the renovation and a name of an architect or interior designer who performed the renovation of the inspirational room can be shown as well.

In one implementation, user 300 requests customized holographic inspirational room images via the holographic enabled device 310, which communicates with the visualization service to obtain the customized holographic inspirational room image(s), transforms the image(s) into holographic representations and assigns or lets the user 300 anchor to a particular area in the environment.

According to certain embodiments, the user 300 may use eye gaze to move between inspirational room images within the field of view 312. In yet another embodiment, voice or hand tracking may be used to provide the interaction to move between inspirational room images within the field of view 312. Eye gaze, voice or hand tracking may also be used to interact with the price 334 of the renovation and the name of the architect or interior designer who performed the renovation 336 of the inspirational room. For example, the user may use eye gaze to obtain more information about the architect or interior designer, such as a business address and a business telephone number.

Figure 4:
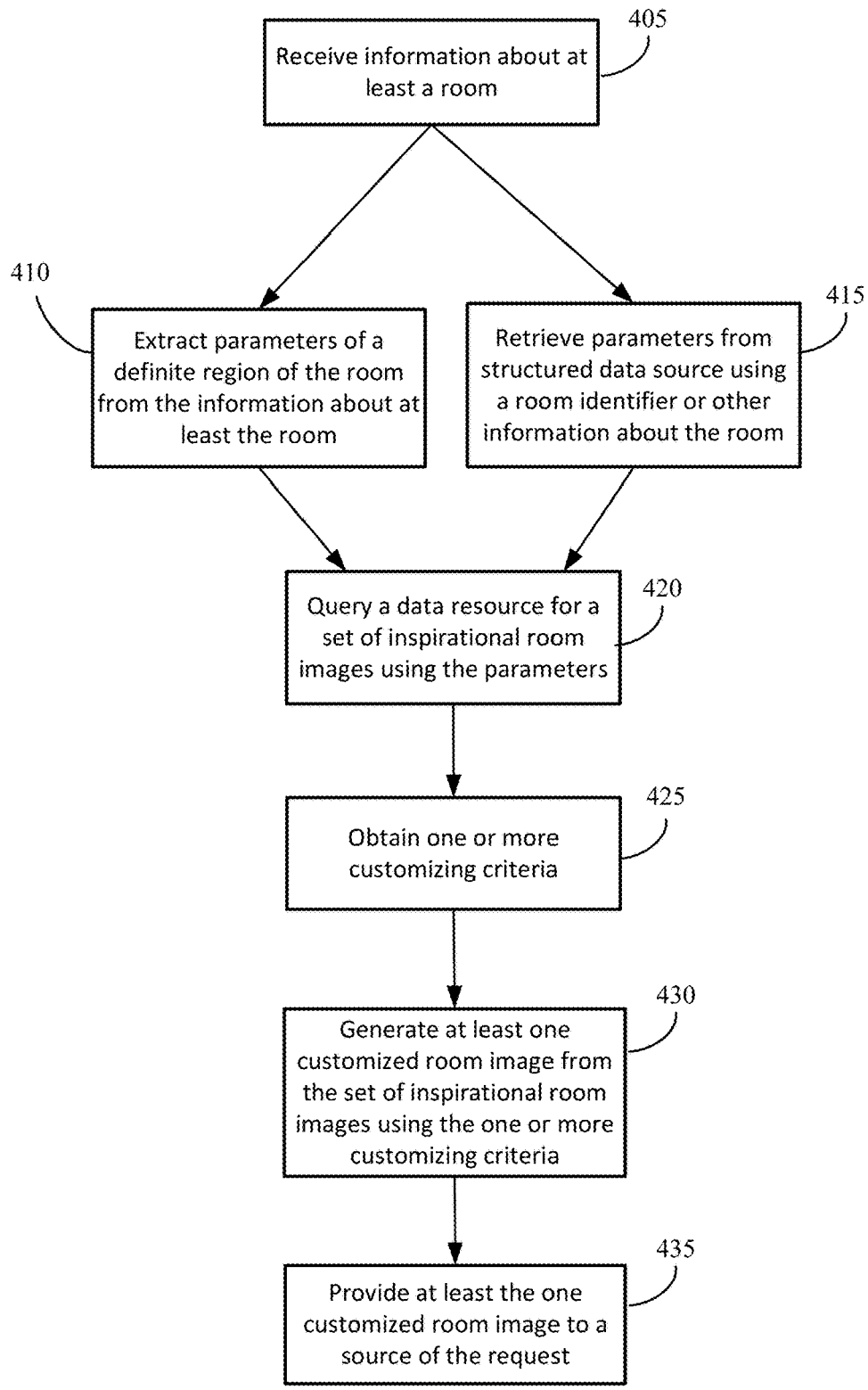
FIG. 4 illustrates an example process flow diagram of a method for providing customized realty renovation visualization according to an embodiment of the invention.

FIG. 4 illustrates an example process flow diagram of a method for providing customized realty renovation visualization according to an embodiment of the invention. In the illustrated scenarios, the renovation visualization is supported by a customized realty renovation visualization service, which may support run-time customizing renovation visualization processes 400 (which can involve the processes described with respect to FIGS. 1B and 1C). The server receives the information about at least a room (405) from the holographic enabled device or via the website as examples. In some cases, the server extracts parameters of a definite region of the room (410). In other cases, where parameters were already extracted, the server retrieves parameters from a structured data source using a room identifier or other information about the room (415). The server queries a data resource for a set of inspirational room images using the parameters (420).

Before, during, or after the querying of the data resource for the set of inspirational room images, the server can obtain one or more customizing criteria (425). The customizing criteria can be provided with the original request, received from a subsequent message from the source of the request, obtained from specific user account information, obtained from community data, or a combination thereof.

After the one or more customizing criteria are obtained, the server can generate at least one customized room image from the set of inspirational room images using the one or more customizing criteria (430) and provide at least the one customized room image to the source of the request (435) for display by the holographic-enabled device or display of the user's computing device.

Figure 5:
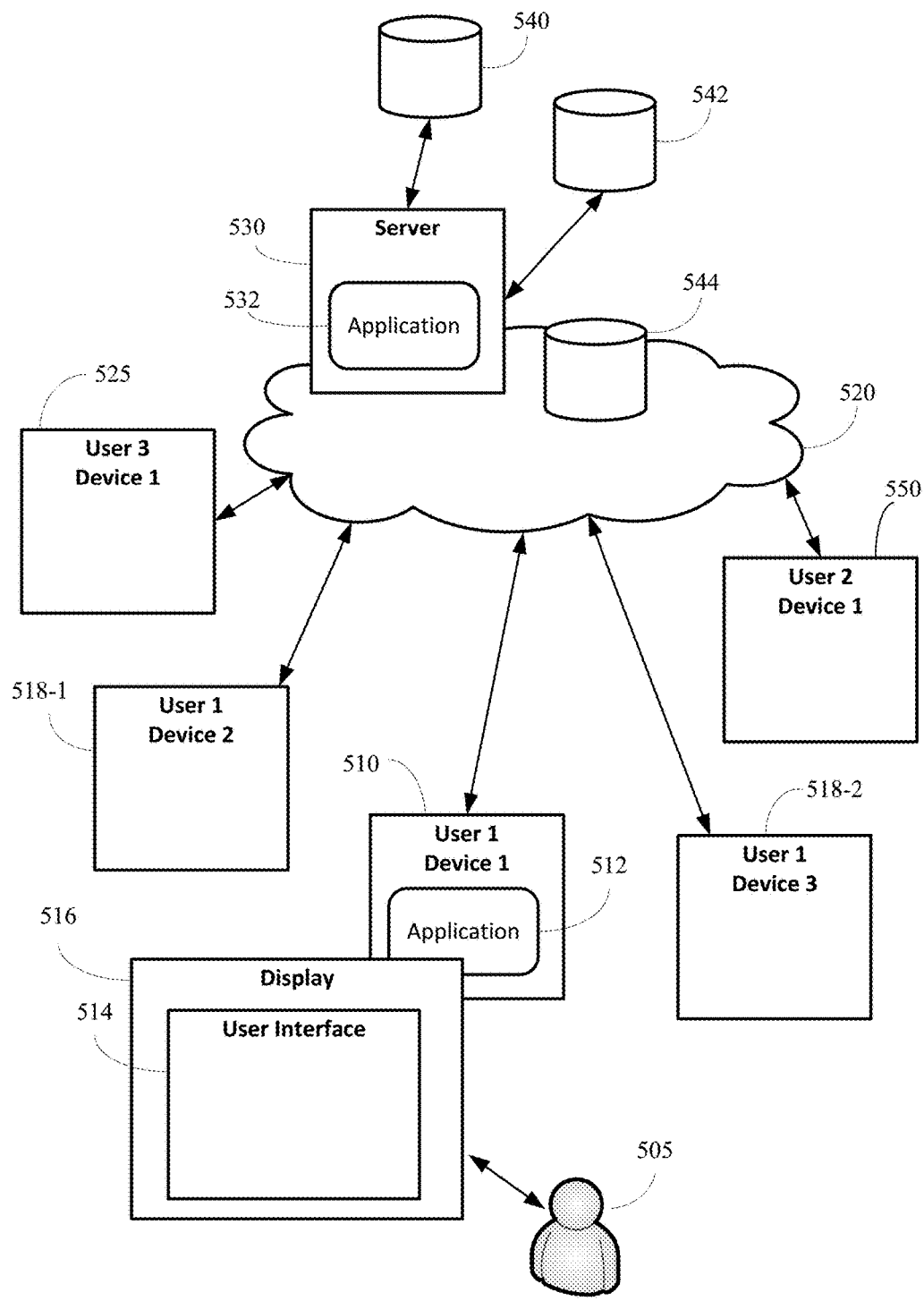
FIG. 5 illustrates an example operating environment in which various embodiments of the invention may be practiced.

FIG. 5 shows an example operating environment in which various embodiments of the invention may be practiced. Referring to FIG. 5, a user 505 may interact with a user computing device 510 running an application 512, such as a real estate application, through a user interface (UI) 514 displayed on a display 516 associated with the computing device 510.

A computing device (e.g., the user computing device 510) is configured to receive input from a user (e.g., user 505) through, for example, a keyboard, mouse, trackpad, touch pad, touch screen, microphone, camera, eye gaze tracker, or other input device. The display 516 of the user computing device 510 is configured to display one or more user interfaces (including UI 514) to the user 505. In some embodiments, the display 516 can include a touchscreen such that the user computing device 510 may receive user input through the display.

The UI 514 enables a user to interact with various applications, such as a visualization application, running on or displayed through the user computing device 510. For example, UI 514 may include a submission portal for users to upload information about a room and a result list that includes inspirational room image(s) for customized realty renovation visualizations. The submission portal may also be used to submit inspirational room images. Generally, UI 514 is configured such that a user may easily interact with functionality of an application. For example, a user may simply select (via, for example, touch, clicking, gesture or voice) an option within UI 514 to perform an operation such scrolling through the results of the inspirational room image(s) of a visualization application 512.

In some cases, the user 505 may have multiple devices running a similar program and the user 505 can view the results of the inspirational room image(s) for customized realty renovation visualizations across multiple user computing devices (such as second device 518-1 and/or third device 518-2).

The user computing device 510 (as well as the second device 518-1 and the third device 518-2) may operate on or in communication with a network 520, and may communicate with one or more servers 530 over the network 520.

The network 520 can be, but is not limited to, a cellular network (e.g., wireless phone), a point-to-point dial up connection, a satellite network, the Internet, a local area network (LAN), a wide area network (WAN), a WiFi network, an ad hoc network or a combination thereof. Such networks are widely used to connect various types of network elements, such as hubs, bridges, routers, switches, servers, and gateways. The network 520 may include one or more connected networks (e.g., a multi-network environment) including public networks, such as the Internet, and/or private networks such as a secure enterprise private network. Access to the network 520 may be provided via one or more wired or wireless access networks as will be understood by those skilled in the art.

As will also be appreciated by those skilled in the art, communication networks can take several different forms and can use several different communication protocols. Certain embodiments of the invention can be practiced in distributed-computing environments where tasks are performed by remote-processing devices that are linked through a communications network. In a distributed-computing environment, program modules can be located in both local and remote computer-readable storage media.

The user computing device 510 can be, but is not limited to, a personal computer (e.g. desktop computer), laptop, personal digital assistant (PDA), video game device, mobile phone (or smart phone), tablet, slate, terminal, holographic-enabled device, and the like. It should be apparent that the user computing device 510 may be any type of computer system that provides its user the ability to load and execute software programs and the ability to access a network, such as network 520. The second device 518-1 and third device 518-2 may include the same types of devices (or systems) as user computing device 510 and they may or may not be of a same form. For example, a user 505 may have a laptop, a tablet, and a smart phone as the three devices.

The visualization application 512 can be stored on the user computing device 510 (e.g., a client-side application) or accessed as a web-based visualization application (e.g., running on a server or hosted on a cloud) using a web browser (e.g., a standard internet browser), and the application's interface may be displayed to the user 505 within the web browser. Thus, the application may be a client-side application and/or a non-client side (e.g., a web-based) application. Visualization application 512 can communicate with visualization server application 532 running on server 532 (and which may provide the visualization service). Visualization server application 532 can carry out process 400 (which may operate similar to that described with respect to FIGS. 1A-1C). In some cases, communication between various applications (client and/or server-side) may be accomplished via APIs.

The data resource 540, associated with server 530 or accessible through the cloud, may store structure data in the form, for example, of a database, and include a collection of inspirational room images and metadata associated with the collection of inspirational room images. The inspirational room images may be provided through a variety of ways. For example, the data set stored at data resource 540 may be populated with inspirational room images by a user uploading inspirational room images through a submission portal. In some embodiments, the inspirational room images may be managed and/or stored as part of curation applications such as Pinterest and Houzz. In cases where the images are stored by a separate system, the data resource 540 may store metadata and a URL to the location of the image.

The information received and/or collected by the visualization service (such as found in the first data set 101 and/or the third data set 103) may be stored in the same data resource 540 along with the collection of inspirational room images or in a separate data resource, such as resource 542.

According to certain embodiments of the invention, while the user is selecting customizing criteria and carrying out a search of inspirational room images in UI 514, user preferences can be stored for each session. For example, when a user selects customizing criteria in the visualization application, the user preference can be stored. The storing of the user preferences can be performed locally at the user computing device 510 and/or by the server 530. User preferences and other usage information may be stored specific for the user 505 and collected over a time frame. The collected data may be referred to as usage data. The visualization application 512 and/or website 532 may collect the information about user preferences as well as other activity user performs with respect to the visualization application 512 and/or webpage 532. Usage data can be collected (with permission) directly by the visualization service (not shown) or first by the visualization application 512 or website 532. It should be understood that usage data does not require personal information and any information considered to be personal or private would be expected to be expressly permitted by the user before such information was stored or used.

In some embodiments, usage data is increased by collecting data from the same user across devices, such as across devices 510, 518-1, and 518-2. The across-device collection can be carried out, for example, where a user signs in to use a program or accesses the program from a client device communicating with a server running the visualization application. In some embodiments where a user uses a same product or program on multiple devices, user preferences within one session on one computing device may be combined with user preferences within a session on another computing device in order to capture additional usage data from the user.

Usage data (which may be part of third data set 103) can be stored, for example as popularity records, at data resource 540, data resource 542, or even by a separate cloud storage system 544. The usage data can be an aggregate of usage data for a community of users. For example, user preferences and other usage information from users of other computing devices, such as second user computing device 550 and third user computing device 552, can be communicated over the network 520 and stored as part of the usage data, which can allow for multiple-user analytics. The analytics can relate to popularity for a community of users. The popularity may be a general popularity, such as whether a specific inspirational room image of a particular inspirational room or a particular style is extremely popular across the entire website. Furthermore, the popularity may be on an image-by-image basis, such as for a specific room, whether a particular inspirational room image is especially popular.

A holographic enabled device may be implemented as a see-through, mixed reality display device. FIG. 6 illustrates an example head-mounted display-based holographic enabled device that may be used in certain implementations described herein; and FIG. 7 illustrates an example computing system that can implement a holographic enabled device.

As shown in FIG. 6, the example head-mounted display-based holographic enabled device can take the form of an HMD device 600. The illustrated HMD device 600 implements computing system 700 in the form of wearable glasses or goggles, but it will be appreciated that other forms are possible. The HMD device 600 includes a see-through display subsystem 706 (e.g., an at least partially see-through stereoscopic display) with one or more lenses 601 that may be configured to visually augment an appearance of a physical environment being viewed by the user through the see-through display subsystem such that inspirational room image(s) may be displayed using lenses 601 (e.g. using projection onto lenses 601, one or more waveguide systems incorporated into the lenses 601, and/or in any other suitable manner).

In some examples, the see-through display subsystem may include one or more regions that are transparent (e.g., optically clear) and may include one or more regions that are opaque or semi-transparent. In other examples, the see-through display subsystem may be transparent (e.g., optically clear) across an entire usable display surface of the see-through display subsystem.

The HMD device 600 includes an optical sensor system 602 that may include one or more optical sensors. In one example, the optical sensor system 602 can include one or more outward facing optical sensors that may be configured to acquire and detect the real-world background and/or physical space from a similar vantage point (e.g., line of sight) as observed by the user through the lenses 601. The optical sensor system 602 may include a variety of sensors, such as one or both of a depth camera/sensor and an RGB camera/sensor. In some cases, a high definition camera or other resolutions for image sensing may be used.

The sensors included with the HMD device 600 can support various functionalities including head tracking to determine the 3D (three-dimensional) position and orientation of the user's head within the physical real world space; and gaze tracking to ascertain a direction of the user's gaze.

For example, the HMD device 600 can include a position sensor system 603 that may include one or more position sensors 604 such as accelerometer(s), gyroscope(s), magnetometer(s), global positioning system(s) (GPS) 605, multilateration tracker(s) (not shown), and/or other sensors that output position sensor information useable as a position, orientation, and/or movement of the relevant sensor.

When position sensor system 603 includes one or more motion sensors 604 (e.g., inertial, multi-axis gyroscopic or acceleration sensors), movement and position/orientation/pose of a user's head may be detected when the user is wearing the system.

The HMD device 600 may further include a gaze detection subsystem 606 configured for detecting a direction of gaze of each eye of a user or a direction or location of focus. Gaze detection subsystem 606 may be configured to determine gaze directions of each of a user's eyes in any suitable manner. For example, in the illustrative example shown, a gaze detection subsystem 606 includes one or more glint sources 607, such as infrared light sources, that are configured to cause a glint of light to reflect from each eyeball of a user, and one or more image sensors 608, such as inward-facing sensors, that are configured to capture an image of each eyeball of the user. Changes in the glints from the user's eyeballs and/or a location of a user's pupil, as determined from image data gathered using the image sensor(s) 608, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 606 may have any suitable number and arrangement of light sources and image sensors. In some implementations, the gaze detection subsystem 606 may be omitted.

The HMD device 600 may include one or more microphones 609 configured to detect sounds, such as voice commands from a user.

Position sensor system 603 (including motion sensors 604), as well as microphone(s) 605 and gaze detection subsystem 606, also may be employed as user input devices, such that a user may interact with the HMD device 600 via gestures of the eye, neck and/or head, as well as via verbal commands in some cases. These systems are represented as input subsystem 708 in FIG. 7.

The HMD device 600 can be configured with one or more audio transducers 610 (e.g., speakers, earphones, etc.) so that audio can be utilized as part of the user experience.

The HMD device 600 can further include a controller 611, which includes components described with respect to computing system 700, such as processing system 702 and storage system 704. Controller 611 can be in communication with the sensors 602, gaze detection subsystem 606, lenses 601, and/or other components through, for example, a communications subsystem 710. The communications subsystem 710 can operate with a network interface and subsystem 712 to facilitate the display system being operated in conjunction with remotely located resources, such as processing, storage, power, data, and services. That is, in some implementations, an HMD device can be operated as part of a system that can distribute resources and capabilities among different components and subsystems.

The storage system 704 may include instructions stored thereon that are executable by processing system 702, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The HMD device 600 may include instructions stored on the storage system 704 for image production/visualization that direct the HMD device 600 to display virtual objects to the user, which are visually superimposed onto the physical environment so as to be perceived at various depths and locations. The HMD device 600 may use stereoscopy to visually place a virtual object at a desired depth by displaying separate images of the virtual object to both of the user's eyes. To achieve the perception of depth, the instructions for image product may render the two images of the virtual object at a rendering focal plane of the HMD device 600, such that there is a binocular disparity between the relative positions of the virtual object in the two images. For example, this binocular disparity may be a horizontal disparity where the relative positions of the virtual object in the two images is separated by a distance in the x axis direction. Here, the x axis may be defined as the axis extending to the left and the right relative to the user, the y axis extending upward and downward relative to the user, and the z axis extending forward and backward relative to the user.

The horizontal disparity between the relative positions of the virtual object in the two images will cause the user to perceive that the virtual object is located at a certain depth within the viewed physical environment due to stereopsis. Using this stereoscopy technique, the HMD device 600 may control the displayed images of the virtual objects, such that the user will perceive that the virtual objects exist at a desired depth and location in the viewed physical environment.

Optical sensor information received from the optical sensor system 602 and/or position sensor information received from position sensor system 603 may be used to assess a position and orientation of the vantage point of the at least partially see-through stereoscopic display relative to other environmental objects. In some embodiments, the position and orientation of the vantage point may be characterized with six degrees of freedom (e.g., world-space X, Y, Z, pitch, roll, and yaw). The vantage point may be characterized globally or independent of the real-world background. The position and/or orientation may be determined with an on-board computing system (e.g., controller 611) and/or an off-board computing system.

Furthermore, the optical sensor information and the position sensor information may be used by a computing system to perform analysis of the real-world background, such as depth analysis, surface reconstruction, environmental color and lighting analysis, or other suitable operations. In particular, the optical and positional sensor information may be used to create a virtual model of the real-world background. In some embodiments, the position and orientation of the vantage point may be characterized relative to this virtual space. Moreover, the virtual model may be used to determine positions of virtual objects in the virtual space and add additional virtual objects to be displayed to the user at a desired depth and location within the virtual world.

When the position sensor system 603 includes GPS 605, the system can use the GPS 605 to determine a location of the HMD device 600. This may help to identify real world objects, such as buildings, etc. that may be located in the user's adjoining physical environment.

A power management subsystem (not shown) may include one or more batteries and/or protection circuit modules (PCMs) and an associated charger interface and/or remote power interface for supplying power to components in the HMD device 600.

It may be understood that sensors illustrated in, and described with respect to, FIG. 6 are included for the purpose of example and are not intended to be limiting in any manner, as any other suitable sensors and/or combination of sensors may be utilized to meet the needs of a particular implementation of a head-mounted holographic enabled device. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

It is to be understood that the display device may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

As mentioned above, computing system 700 can implement a holographic enabled device, including, but not limited to HMD device 600. Computing system 700 includes a processing system 702, which can include a logic processor (and may even include multiple processors of same or different types), and a storage system 704, which can include volatile and non-volatile memory.

Processing system 702 may include one or more physical processors (hardware) configured to execute software instructions. Additionally or alternatively, the logic processor may include one or more hardware logic circuits or firmware devices configured to execute hardware-implemented logic or firmware instructions. Processors of the processing system 702 may be single-core or multi-core, and the instructions executed thereon may be configured for sequential, parallel, and/or distributed processing. Individual components of the processing system 702 optionally may be distributed among two or more separate devices, which may be remotely located and/or configured for coordinated processing. Aspects of the processing system 702 may be virtualized and executed by remotely accessible, networked computing devices configured in a cloud-computing configuration. In such a case, these virtualized aspects are run on different physical logic processors of various different machines, it will be understood.

Processing system 702 includes one or more physical devices configured to execute instructions. The processing system 702 may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result. When the instructions are software based (as opposed to hardware-based such as implemented in a field programmable gate array (FPGA) or digital logic), the instructions can be stored as software 705 in the storage system 704. Software 705 can include components for a customized renovation visualization application as described herein.

Storage system 704 may include physical devices that are removable and/or built-in. Storage system 704 can include one or more volatile and non-volatile storage devices such as optical memory (e.g., CD, DVD, HD-DVD, Blu-Ray Disc, etc.), semiconductor memory (e.g., RAM, SRAM, DRAM, ROM, EPROM, EEPROM, FLASH memory, etc.), and/or magnetic memory (e.g., hard-disk drive, floppy-disk drive, tape drive, MRAM, etc.), or other mass storage device technology. Storage system 704 may include dynamic, static, read/write, read-only, random-access, sequential-access, location-addressable, file-addressable, and/or content-addressable devices. It should be understood that a storage device or a storage medium of the storage system includes one or more physical devices and excludes propagating signals per se. It can be appreciated that aspects of the aspects of the instructions described herein may be propagated by a pure signal (e.g., an electromagnetic signal, an optical signal, etc.) using a communications medium, as opposed to being stored on a storage device or medium. Furthermore, data and/or other forms of information pertaining to the present arrangement may be propagated by a pure signal.

Aspects of processing system 702 and storage system 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via processing system 702 executing instructions held by a non-volatile storage of storage system 704, using portions of a volatile storage of storage system 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 706 may be used to present a visual representation of data held by storage system 704. This visual representation may take the form of a graphical user interface (GUI). As the herein described methods and processes change the data held by the storage system, and thus transform the state of the storage system, the state of display subsystem 706 may likewise be transformed to visually represent changes in the underlying data. Display subsystem 706 may include one or more display devices utilizing virtually any type of technology. Such display devices may be combined with processing system 702 and/or storage system 704 in a shared enclosure, or such display devices may be peripheral display devices. The at least partially see-through display of HMD 600 described above is one example of a display subsystem 706.

When included, input subsystem 708 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; any of the sensors described above with respect to FIG. 6 and/or any other suitable sensor.

When included, network interface and subsystem 712 may be configured to communicatively couple computing system 700 with one or more other computing devices. Network interface and subsystem 712 may include wired and/or wireless communication devices compatible with one or more different communication protocols. As non-limiting examples, the network interface and subsystem 712 may be configured for communication via a wireless telephone network, or a wired or wireless, near-field, local- or wide-area network. In some embodiments, the network interface and subsystem 712 may allow computing system 700 to send and/or receive messages to and/or from other devices via a network such as the Internet.

FIG. 8 illustrates components of a computing device that may be used in certain implementations described herein. Referring to FIG. 8, system 800 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, or a smart television. Accordingly, more or fewer elements described with respect to system 800 may be incorporated to implement a particular computing device.

System 800 includes a processing system 805 of one or more processors to transform or manipulate data according to the instructions of software 810 stored on a storage system 815. Examples of processors of the processing system 805 include general purpose central processing units, application specific processors, and logic devices, as well as any other type of processing device, combinations, or variations thereof. The processing system 805 may be, or is included in, a system-on-chip (SoC) along with one or more other components such as network connectivity components, sensors, video display components.

The software 810 can include an operating system and application programs such as a visualization application 820 that may include components for communicating with visualization service (e.g. running on server such as system 100 or system 900). Device operating systems generally control and coordinate the functions of the various components in the computing device, providing an easier way for applications to connect with lower level interfaces like the networking interface. Non-limiting examples of operating systems include Windows® from Microsoft Corp., Apple® iOS™ from Apple, Inc., Android® OS from Google, Inc., and the Ubuntu variety of the Linux OS from Canonical.

It should be noted that the operating system may be implemented both natively on the computing device and on software virtualization layers running atop the native device operating system (OS). Virtualized OS layers, while not depicted in FIG. 8, can be thought of as additional, nested groupings within the operating system space, each containing an OS, application programs, and APIs.

Storage system 815 may comprise any computer readable storage media readable by the processing system 805 and capable of storing software 810 including the visualization application 820.

Storage system 815 may include volatile and nonvolatile, removable and non-removable media implemented in any method or technology for storage of information, such as computer readable instructions, data structures, program modules, or other data. Examples of storage media of storage system 815 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a propagated signal or carrier wave.

Storage system 815 may be implemented as a single storage device but may also be implemented across multiple storage devices or sub-systems co-located or distributed relative to each other. Storage system 815 may include additional elements, such as a controller, capable of communicating with processing system 805.

Software 810 may be implemented in program instructions and among other functions may, when executed by system 800 in general or processing system 805 in particular, direct system 800 or the one or more processors of processing system 805 to operate as described herein.

In general, software may, when loaded into processing system 805 and executed, transform computing system 800 overall from a general-purpose computing system into a special-purpose computing system customized to retrieve and process the information for facilitating content authoring as described herein for each implementation. Indeed, encoding software on storage system 815 may transform the physical structure of storage system 815. The specific transformation of the physical structure may depend on various factors in different implementations of this description. Examples of such factors may include, but are not limited to the technology used to implement the storage media of storage system 815 and whether the computer-storage media are characterized as primary or secondary storage.

The system can further include user interface system 830, which may include input/output (I/O) devices and components that enable communication between a user and the system 800. User interface system 830 can include input devices such as a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input.

The user interface system 830 may also include output devices such as display screen(s), speakers, haptic devices for tactile feedback, and other types of output devices. In certain cases, the input and output devices may be combined in a single device, such as a touchscreen display which both depicts images and receives touch gesture input from the user. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

Visual output may be depicted on the display in myriad ways, presenting graphical user interface elements, text, images, video, notifications, virtual buttons, virtual keyboards, or any other type of information capable of being depicted in visual form.

The user interface system 830 may also include user interface software and associated software (e.g., for graphics chips and input devices) executed by the OS in support of the various user input and output devices. The associated software assists the OS in communicating user interface hardware events to application programs using defined mechanisms. The user interface system 830 including user interface software may support a graphical user interface, a natural user interface, or any other type of user interface. For example, the interfaces for the customization realty renovation visualization described herein may be presented through user interface system 830.

Communications interface 840 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

Computing system 800 is generally intended to represent a computing system with which software is deployed and executed in order to implement an application, component, or service for customization realty renovation visualization as described herein. In some cases, aspects of computing system 800 may also represent a computing system on which software may be staged and from where software may be distributed, transported, downloaded, or otherwise provided to yet another computing system for deployment and execution, or yet additional distribution.

FIG. 9 illustrates components of a computing system that may be used to implement certain methods and services described herein. Referring to FIG. 9, system 900 may be implemented within a single computing device or distributed across multiple computing devices or sub-systems that cooperate in executing program instructions. The system 900 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 900 can include a processing system 920, which may include one or more processors and/or other circuitry that retrieves and executes software 905 from storage system 915. Processing system 920 may be implemented within a single processing device but may also be distributed across multiple processing devices or sub-systems that cooperate in executing program instructions.

Examples of processing system 920 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general purpose CPU.

Storage system(s) 915 can include any computer readable storage media readable by processing system 920 and capable of storing software 905 including instructions for customized realty renovation visualization service 910. Storage system 915 may include volatile and nonvolatile, removable and non-removable media implemented in any method or technology for storage of information, such as computer readable instructions, data structures, program modules, or other data. Examples of storage media include random access memory, read only memory, magnetic disks, optical disks, CDs, DVDs, flash memory, virtual memory and non-virtual memory, magnetic cassettes, magnetic tape, magnetic disk storage or other magnetic storage devices, or any other suitable storage media. In no case is the storage medium of storage system a propagated signal or carrier wave.

In addition to storage media, in some implementations, storage system 915 may also include communication media over which software may be communicated internally or externally. Storage system 915 may be implemented as a single storage device but may also be implemented across multiple storage devices or sub-systems co-located or distributed relative to each other. Storage system 915 may include additional elements, such as a controller, capable of communicating with processing system 920.

In some cases, storage system 915 includes data resource 930. In other cases, the data resource 930 is part of a separate system with which system 900 communicates, such as a remote storage provider. For example, data, such as information about a room or an inspirational room image, may be stored on any number of remote storage platforms that may be accessed by the system 900 over communication networks via the communications interface 925. Such remote storage providers might include, for example, a server computer in a distributed computing network, such as the Internet. They may also include "cloud storage providers" whose data and functionality are accessible to applications through OS functions or APIs.

Software 905 may be implemented in program instructions and among other functions may, when executed by system 900 in general or processing system 920 in particular, direct the system 900 or processing system 920 to operate as described herein for a service 910 receiving communications associated with a customization realty renovation visualization application such as described herein.

Software 905 may also include additional processes, programs, or components, such as operating system software or other application software. It should be noted that the operating system may be implemented both natively on the computing device and on software virtualization layers running atop the native device operating system (OS). Virtualized OS layers, while not depicted in FIG. 9, can be thought of as additional, nested groupings within the operating system space, each containing an OS, application programs, and APIs.

Software 905 may also include firmware or some other form of machine-readable processing instructions executable by processing system 920.

System 900 may represent any computing system on which software 905 may be staged and from where software 905 may be distributed, transported, downloaded, or otherwise provided to yet another computing system for deployment and execution, or yet additional distribution.

In embodiments where the system 900 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 925 may be included, providing communication connections and devices that allow for communication between system 900 and other computing systems (not shown) over a communication network or collection of networks (not shown) or the air.

Certain techniques set forth herein with respect to customized realty renovation visualization may be described in the general context of computer-executable instructions, such as program modules, executed by one or more computing devices including holographic enabled devices. Generally, program modules include routines, programs, objects, components, and data structures that perform particular tasks or implement particular abstract data types.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Embodiments may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

Computer-readable media can be any available computer-readable storage media or communication media that can be accessed by the computer system.

Communication media include the media by which a communication signal containing, for example, computer-readable instructions, data structures, program modules, or other data, is transmitted from one system to another system. The communication media can include guided transmission media, such as cables and wires (e.g., fiber optic, coaxial, and the like), and wireless (unguided transmission) media, such as acoustic, electromagnetic, RF, microwave and infrared, that can propagate energy waves. Although described with respect to communication media, carrier waves and other propagating signals that may contain data usable by a computer system are not considered computer-readable "storage media."

By way of example, and not limitation, computer-readable storage media may include volatile and non-volatile, removable and non-removable media implemented in any method or technology for storage of information such as computer-readable instructions, data structures, program modules or other data. Examples of computer-readable storage media include volatile memory such as random access memories (RAM, DRAM, SRAM); non-volatile memory such as flash memory, various read-only-memories (ROM, PROM, EPROM, EEPROM), phase change memory, magnetic and ferromagnetic/ferroelectric memories (MRAM, FeRAM), and magnetic and optical storage devices (hard drives, magnetic tape, CDs, DVDs). As used herein, in no case does the term "storage media" consist of carrier waves or propagating signals.

Certain aspects of the invention provide the following non-limiting examples.

Techniques are provided for a method for customizing renovation visualizations, comprising: receiving a request to customize a renovation visualization, the request comprising information about at least a room depicted in the renovation visualization; querying a data resource for a set of inspirational room images using parameters of a definite region of the room obtained from the information about at least the room; generating at least one customized room image from the set of inspirational room images using one or more customizing criteria; and providing the at least one customized room image for customized realty renovation visualization.

In an example further to the above example, the method can further comprise a data set stored on the data resource, the data set providing information on a plurality of inspirational room images, including the set of inspirational room images.

In an example further to any of the above examples, querying the data resource for the set of inspirational room images comprises: performing fuzzy matching of the parameters of the definite region of the room with the information on the plurality of inspirational room images.

In an example further to any of the above examples, the request further comprises the at least one of the one or more customizing criteria.

In an example further to any of the above examples, the method further comprises extracting the parameters of the definite region of the room from the information about at least the room and storing the parameters as part of a first structured data set.

In an example further to any of the above examples, the parameters of the definite region of the room comprise one or more of a spatial dimension of the room, a position of at least one door in the room, a position of at least one window in the room, and a viewing angle.

In an example further to any of the above examples, wherein the customizing criteria comprise one or more of a style, a price, popularity, a time, and a location.

In an example further to any of the above examples, wherein the information about at least the room comprises one or more of an image, sensor data, a floor plan, sensor data, and user input data.

In an example, a system is provided for customizing renovation visualizations. The system can comprise: a processing system; a storage system; a data resource associated with the storage system; a data set stored on the data resource, the data set providing information on a plurality of inspirational room images; and instructions for customizing renovation visualizations stored on the storage system that when executed by the processing system, direct the processing system to at least: in response to receiving a request to customize a renovation visualization, query the data resource for a set of inspirational room images; generate at least one customized room image from the set of inspirational room images using one or more customizing criteria; and provide at least the one customized room image to a source of the request to include in the renovation visualization.

In an example further to the above example, the instructions for customizing renovation visualizations further direct the processing system to at least: receive information about at least a room; extract parameters of a definite region of the room from the information about at least the room; and store the parameters extracted from the information about at least the room on the storage system.

In an example further to the above example, the parameters of the definite region of the room comprise one or more of a spatial dimension of the room, a position of at least one door in the room, a position of at least one window in the room, and a viewing angle.

In an example further to any of the above examples, the information about at least the room comprises one or more of an image, a floor plan, user input data, and sensor data.

In an example further to any of the above examples, the information about at least the room is received as part of the request to customize the renovation visualization.

In an example further to any of the above examples, the instructions that direct the processing system to query the data resource for a set of inspirational room images direct the processing system to at least: perform a fuzzy matching of one or more of the parameters of the definite region of the room against the data set stored in the data resource.

In an example further to any of the above examples, the request comprises at least one of the customizing criteria.

In an example further to any of the above examples, the customizing criteria comprise one or more of a style, a price, popularity, a time, and a location.

In an example further to any of the above examples, the system can further comprise popularity records for the inspirational room images stored on the data resource associated with the storage system, the storage system further comprising instructions stored thereon that when executed by the processing system, direct the processing system to at least update the popularity records with usage data.

In an example, one or more computer readable storage media are provided having instructions stored thereon that when executed by a processing system direct the processing system to at least: receive information about at least a room; in a case that the information comprises one or more of an image, a floor plan, user input data from a form or natural language interface, or sensor data, extract parameters of a definite region of the room from the information about at least the room; in a case that the information comprises identifying information of a previously stored definite region of the room, retrieve the parameters from a structure data source; query a data resource for a set of inspirational room images using the parameters of the definite region of the room; obtain one or more customizing criteria; generate at least one customized room image from the set of inspirational room images using the one or more customizing criteria; and provide at least the one customized room image to a source of a request to customize a renovation visualization.

In an example further to the above example, the instructions that direct the processing system to at least provide at least the one customized room image to the source of the request to customize the renovation visualization direct the processing system to at least: provide at least a specific inspirational room image from the set of inspirational room images.

In an example further to any of the above examples, the instructions that direct the processing system to at least provide at least the one customized room image to the source of the request to customize the renovation visualization direct the processing system to at least: provide at least a specific inspirational room image from the set of inspirational room images overlayed on an image of the definite region of the room.

In an example further to any of the above examples, the source of the request is a holographic-enabled device, and the information about at least the room comprises sensor data from the holographic-enabled device.

It should be understood that the examples described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims subject to any explicit definitions and disclaimers regarding terminology as provided above.

What is claimed is:

1. A system for customizing renovation visualizations, comprising:
a holographic-enabled device comprising a processor, storage media, a communication interface, at least one sensor, an at least partially see-through stereoscopic display, and instructions for customizing renovation visualizations stored on the storage media that, when executed by the processor, direct the holographic-enabled device to at least:
receive sensor data of at least a room from the at least one sensor, wherein the sensor data comprises one or more of data from an optical or image sensor, data from a position sensor, or data from an orientation sensor;
transform the sensor data into parameters of a definite region of the room;
generate a query using the parameters of the definite region of the room;
query a data resource for a set of room images having a spatial similarity with the room as defined by the parameters by using the generated query;
identify one or more customized room images from the set of room images using one or more customizing criteria;
transform at least one of the one or more customized room images into a holographic representation; and
display the holographic representation via the at least partially see-through stereoscopic display.

2. The system of claim 1, further comprising a data set stored on the data resource, the data set providing information on a plurality of room images, including the set of room images.

3. The system of claim 2, wherein the instructions that direct the processor to query the data resource for a set of room images direct the holographic-enabled device to at least:
perform fuzzy matching of the parameters of the definite region of the room with the information on the plurality of room images.

4. The system of claim 1, wherein the parameters of the definite region of the room comprise one or more of a spatial dimension of the room, a position of at least one door in the room, a position of at least one window in the room, and a viewing angle.

5. The system of claim 1, further comprising popularity records for the room images stored on the data resource, wherein the instructions further direct the holographic-enabled device to at least update the popularity records with usage data.

6. A method for customizing renovation visualizations, comprising:
receiving an image of at least a room captured by a camera;
extracting parameters of a definite region of the room by performing image analysis on the image;
generating a query using the parameters of the definite region of the room;
querying a data resource for a set of room images having a spatial similarity with the room as defined by the parameters by using the generated query;
identifying one or more customized room images from the set of room images using one or more customizing criteria; and
displaying, in a graphical user interface of a computing system, the image along with the one or more customized room images.

7. The method of claim 6, wherein the camera is part of the computing system.

8. The method of claim 6, wherein the camera is separate from the computing system.

9. The method of claim 6, wherein the parameters of the definite region of the room comprise one or more of a spatial dimension of the room, a position of at least one door in the room, a position of at least one window in the room, and a viewing angle.

10. The method of claim 6, wherein the one or more customizing criteria comprise one or more of a style, a price, popularity, a time, and a location.

11. A method for customizing renovation visualizations, comprising:
- receiving a selection of an image of at least a room from storage, the image being a photograph of the at least a room or a floor plan of the at least the room;
- retrieving one or more of the image and metadata associated with the image from the storage;
- extracting parameters of a definite region of the room from the one or more of the image and metadata associated with the image by performing one or more of image analysis and optical character recognition on the image or using slot filling techniques on the metadata;
- generating a query using the parameters of the definite region of the room;
- querying a data resource for a set of room images having a spatial similarity with the room as defined by the parameters by using the generated query;
- identifying one or more customized room images from the set of room images using one or more customizing criteria;
- overlaying at least one of the one or more customized room images onto the image; and
- providing the overlaid at least one of the one or more customized room images to a source of a request to customize a renovation visualization of the at least the room.

12. The method of claim 11, wherein the parameters of the definite region of the room comprise one or more of a spatial dimension of the room, a position of at least one door in the room, a position of at least one window in the room, and a viewing angle.

13. The method of claim 11, wherein the one or more customizing criteria comprise one or more of a style, a price, popularity, a time, and a location.

14. The method of claim 11, wherein querying the data resource for the set of room images comprises:
- performing a fuzzy matching of one or more of the parameters of the definite region of the room against a data set stored in the data resource.

15. The method of claim 11, further comprising storing the parameters as part of a first structured data set.

16. One or more computer readable storage media having instructions stored thereon that when executed by a processing system direct the processing system to at least:
- receive a request to customize a renovation visualization, the request comprising identifying information of a previously stored definite region of a room;
- retrieve parameters of the definite region of the room from a structured data resource;
- generate a query using the parameters of the definite region of the room;
- query a data resource for a set of room images having a spatial similarity with the room as defined by the parameters by using the generated query;
- identify one or more customized room images from the set of room images using one or more customizing criteria;
- provide the one or more customized room images to a source of the request to customize a renovation visualization;
- receive a selection of at least one of the one or more customized room images;
- overlay at least one of the one or more customized room images onto an image; and
- provide the overlaid at least one of the one or more customized room images.

17. The media of claim 16, further comprising instructions that direct the processing system to:
- receive a selection of the image from storage, the image being a photograph of at least the room or a floor plan of at least the room;
- retrieve one or more of the image and metadata associated with the image from the storage;
- extract parameters of the definite region of the room from the one or more of the image and metadata associated with the image by performing one or more of image analysis and optical character recognition on the image or using slot filling techniques on the metadata; and
- store at least the parameters of the definite region of the room in the structured data resource.

18. The media of claim 16, wherein the parameters of the definite region of the room comprise one or more of a spatial dimension of the room, a position of at least one door in the room, a position of at least one window in the room, and a viewing angle.

19. The media of claim 16, wherein the request further comprises the at least one of the one or more customizing criteria, wherein the one or more customizing criteria comprise one or more of a style, a price, popularity, a time, and a location.

20. The media of claim 16, wherein the instructions that direct the processing system to query the data resource for the set of room images direct the processing system to at least:
- perform a fuzzy matching of one or more of the parameters of the definite region of the room against a data set stored in the data resource.

* * * * *